US008831227B2

United States Patent
Ge et al.

(10) Patent No.: US 8,831,227 B2
(45) Date of Patent: Sep. 9, 2014

(54) METHOD AND SYSTEM FOR ESTABLISHING SECURE CONNECTION BETWEEN STATIONS

(75) Inventors: Li Ge, Shaanxi (CN); Jun Cao, Shaanxi (CN); Manxia Tie, Shaanxi (CN); Qin Li, Shaanxi (CN); Xiaolong Lai, Shaanxi (CN)

(73) Assignee: China Iwncomm Co., Ltd., Xi'an (CN)

( * ) Notice: Subject to any disclaimer, the term of this patent is extended or adjusted under 35 U.S.C. 154(b) by 41 days.

(21) Appl. No.: 13/516,257

(22) PCT Filed: May 21, 2010

(86) PCT No.: PCT/CN2010/073040
§ 371 (c)(1),
(2), (4) Date: Jun. 15, 2012

(87) PCT Pub. No.: WO2011/075976
PCT Pub. Date: Jun. 30, 2011

(65) Prior Publication Data
US 2012/0257755 A1    Oct. 11, 2012

(30) Foreign Application Priority Data
Dec. 21, 2009   (CN) .............................. 200910311944

(51) Int. Cl.
G06F 21/00 (2013.01)
H04L 9/08 (2006.01)
H04L 29/06 (2006.01)

(52) U.S. Cl.
CPC .............. H04L 9/083 (2013.01); H04L 63/061 (2013.01)
USPC ......................................................... 380/281

(58) Field of Classification Search
USPC ......................................................... 380/281
See application file for complete search history.

(56) References Cited

U.S. PATENT DOCUMENTS 8,019,996 B2   9/2011   Hashimoto et al.
8,185,091 B2   5/2012   Pang et al.
(Continued)

FOREIGN PATENT DOCUMENTS

CN   1681241 A   10/2005
CN   1747381 A   3/2006
(Continued)

OTHER PUBLICATIONS

Liu, Donggang, Peng Ning, and Rongfang Li. "Establishing pairwise keys in distributed sensor networks." ACM Transactions on Information and System Security (TISSEC) 8.1 (2005): 41-77.*

(Continued)

Primary Examiner — Kambiz Zand
Assistant Examiner — Michael Guirguis
(74) Attorney, Agent, or Firm — Harness, Dickey & Pierce, P.L.C.

(57) ABSTRACT

A method and system for establishing a secure connection between stations are disclosed. The method includes that: 1) a switch device receives an inter-station key request packet sent by a first user terminal; 2) the switch device generates an inter-station key, constructs an inter-station key announcement packet and sends it to a second user terminal; 3) the switch device receives an inter-station key announcement response packet sent by the second user terminal; 4) the switch device constructs an inter-station key announcement response packet and sends it to the first user terminal; 5) the switch device receives an inter-station key announcement response packet sent by the first user terminal. The switch device establishes an inter-station key for the two stations which are connected to the switch device directly, by which the embodiments of the present invention ensure the confidentiality and integrity of user data between the stations.

18 Claims, 1 Drawing Sheet

(56) References Cited

U.S. PATENT DOCUMENTS

| | | |
|---|---|---|
| 8,195,935 B2 | 6/2012 | Tian et al. |
| 2005/0235148 A1* | 10/2005 | Scheidt et al. ............... 713/168 |
| 2007/0064950 A1* | 3/2007 | Suzuki et al. ............... 380/270 |
| 2008/0219452 A1* | 9/2008 | Lu et al. ............... 380/283 |
| 2009/0103728 A1 | 4/2009 | Patel |
| 2009/0279705 A1* | 11/2009 | Sun et al. ............... 380/279 |
| 2009/0300358 A1 | 12/2009 | Pang et al. |
| 2010/0293370 A1 | 11/2010 | Xiao et al. |

FOREIGN PATENT DOCUMENTS

| | | | |
|---|---|---|---|
| CN | 1937489 A | | 3/2007 |
| CN | 101159538 A | | 4/2008 |
| CN | 101159543 A | | 4/2008 |
| EP | 1912407 A1 | | 4/2008 |
| JP | 2008098792 A | | 4/2008 |
| JP | 2008259148 A | | 10/2008 |
| JP | 2009188769 A | | 8/2009 |
| JP | 2010504669 A | | 2/2010 |
| JP | 2010504670 A | | 2/2010 |
| JP | 2011512699 A | | 4/2011 |
| KR | 20080088002 A | | 10/2008 |
| WO | WO-2007121587 A1 | | 11/2007 |

OTHER PUBLICATIONS

IEEE Std 802.3™—2005 (Revision of IEEE Std 802.3-2002 including app approved amendments); IEEE Standard for Information technology—Telecommunications and information exchange between systems—Local and metropolitan area networks—Specific requirements. Part 3: Carrier sense multiple access with collision detection (CSMA/CD) access method and physical layer specifications. IEEE Computer Society, IEEE, New York, NY, USA, Dec. 9, 2005.

IEEE Std 802.1AE™—2006—IEEE Standard for Local and metropolitan area networks—Media Access Control (MAC) Security. IEEE Computer Society, IEEE, New York, NY, USA, Aug. 18, 2006.

International Search Report (in Chinese with English translation) and Written Opinion (in Chinese) for PCT/CN2010/073040, mailed Sep. 30, 2010; ISA/CN.

Chapter 12: Key Establishment Protocols ED—Menezes A J; Van Oorschot PC; Vanstone SA; Handbook of Applied Cryptography; CRC Press, Boca Raton, Fl, US, pp. 489-541, 1997.

European Search Report regarding Application No. 10838542.8—1870/2518931 PCT/CN2010073040 dated May 30, 2014.

* cited by examiner

METHOD AND SYSTEM FOR ESTABLISHING SECURE CONNECTION BETWEEN STATIONS

This application is a National stage application of PCT international application PCT/CN2010/073040, filed on May 21, 2010 which claims the priority of Chinese Patent Application No. 200910311944.X, entitled "METHOD AND SYSTEM FOR ESTABLISHING SECURITY CONNECTION BETWEEN STATIONS", filed with the Chinese Patent Office on Dec. 21, 2009, both of which are incorporated herein by reference in its entirety.

FIELD OF THE INVENTION

The present invention relates to the field of network communication technique, and in particular to a method and system for establishing security connection between stations.

BACKGROUND OF THE INVENTION

The wired local area network is generally a broadcast-type network, in which data sent by one node can be received by all the other nodes. Individual nodes on the network share the channel, which causes great potential safety hazard to the network. An attacker can capture all the data packets on the network as long as he/she accesses the network to monitor, and thus stealing important information.

The Local Area Network (LAN) defined according to the existing national standard does not provide the method for security access and data secrecy. The user can access the equipment and the resource in the LAN as long as he/she can access the LAN control equipment, such as the switch equipment in the LAN. This did not cause significant potential safety hazard in the application environment of the early-stage wired enterprise LAN; however, with the development of the network on a large scale, the requirement on the privacy of the information by the user is becoming higher and higher, and then it is necessary to realize data security in the data link layer.

In a wired LAN, IEEE realizes the security of the data link layer by performing security enhancement on IEEE 802.3. IEEE 802.1AE provides a data encryption protocol for protection of the Ethernet data, and realizes the safe transmission of information between network entities by employing a safety measure of hop-by-hop encryption. However, this safety measure, such as hop-by-hop encryption, requires that the switch device performs the processes of decryption, encryption and then transmission on each data packet to be transmitted, which undoubtedly brings heavy calculation load to the switch equipment in the LAN, and is prone to inducing attack on the switch equipment by an attacker; and the delay of transmitting a data packet from a sender to a receiver will be increased and the efficiency of network transmission is reduced.

In the wired LAN, there are always large amount of communication data between stations (STA) connected directly to the same switch device (SW), and the secrecy transmission of these communication data will always pass through the switch device. If the data packet passing through the switch device needs to be decrypted, encrypted and then transmitted, then not only the calculation load of the switch device and the delay of the network will be increased, but also the transmission efficiency of the network will be greatly induced.

SUMMARY OF THE INVENTION

To solve the technical problem existing in the prior art, an embodiment of the present invention provides a method and system for establishing security connection between stations. The confidentiality and integrality of user data between the stations can be ensured by the switch device establishing an inter-station key for the two direct-connected stations thereof.

An embodiment of the present invention provides a method for establishing security connection between stations, and the method includes:

1) receiving, by a switch device, an inter-station key request packet sent by a first station;

2) generating, by the switch device, an inter-station key, constructing an inter-station key announcement packet and sending the inter-station key announcement packet to a second station;

3) receiving, by the switch device, an inter-station key announcement response packet sent by the second station;

4) constructing, by the switch device, an inter-station key announcement packet and sending the inter-station key announcement packet to the first station; and 5) receiving, by the switch device, an inter-station key announcement response packet sent by the first station.

An embodiment of the present invention further provides a system for establishing security connection between stations, and the system includes: a first station adapted for sending an inter-station key request packet and an inter-station key announcement response packet to a switch device, receiving an inter-station key announcement packet from the switch device and communicating secretly with a second station; the switch device adapted for receiving an inter-station key request packet, sending an inter-station key announcement packet to the second station, receiving an inter-station key announcement response packet sent by the second station, sending an inter-station key announcement packet to the first station, and receiving an inter-station key announcement response packet sent by the first station; and the second station adapted for receiving an inter-station key announcement packet sent by the switch device, sending an inter-station key announcement response packet to the switch device and communicating secretly with the first station.

The embodiments of the present have the following advantages. In the method and system for establishing security connection between stations according to the embodiments of the present, after a shared unicast key has been established between the switch device and the direct-connected stations based on a security mechanism such as pre-distribution, a shared switch key, i.e., the inter-station key STAkey, is established between two direct-connected stations under the switch device through the switch device, and this key is used for the data communication process between stations, so as to guarantee the confidentiality of data transmission process between direct-connected stations under the switch device in the data link layer and realizing direct transmission of communication data between stations under the switch device through the switch device. As compared with the conventional method, the calculation load of the switch device is reduced, and the transmission efficiency of the network is improved.

DETAILED DESCRIPTION OF THE INVENTION

The direct-connected stations under the switch device defined in the embodiment of the present invention refer to the stations that are connected directly to a certain port of the switch device, including the stations that are connected directly to the switch device by a net cable and the stations that are connected to the switch device by a physical layer device such as a hub. The stations that are connected to the switch device by other devices are not the direct-connected station of the switch device.

In the case that security connections between the first station and the switch device, and between the second station and the switch device have been established respectively, i.e., have shared unicast keys, the embodiment of the present invention can establish a shared inter-station key, i.e., the security connection, between the first station and the second station by using the switch device.

The unicast key defined in the embodiment of the present invention includes two parts: a Protocol Data Key (PDK) and a User Data Key (UDK), where the PDK is used for protecting the confidentiality of the key data in the protocol data and the integrity of the protocol data, and the UDK is used for protecting the confidentiality and integrity of the user data between devices. In practical application, the structure of the PDK and the UDK can vary with the working mode of the block cipher algorithm, and the key for protecting the confidentiality and integrity of the data can be the same or different. The establishing mechanism of the unicast key is not defined and limited in the embodiment of the present invention.

Figure 1:
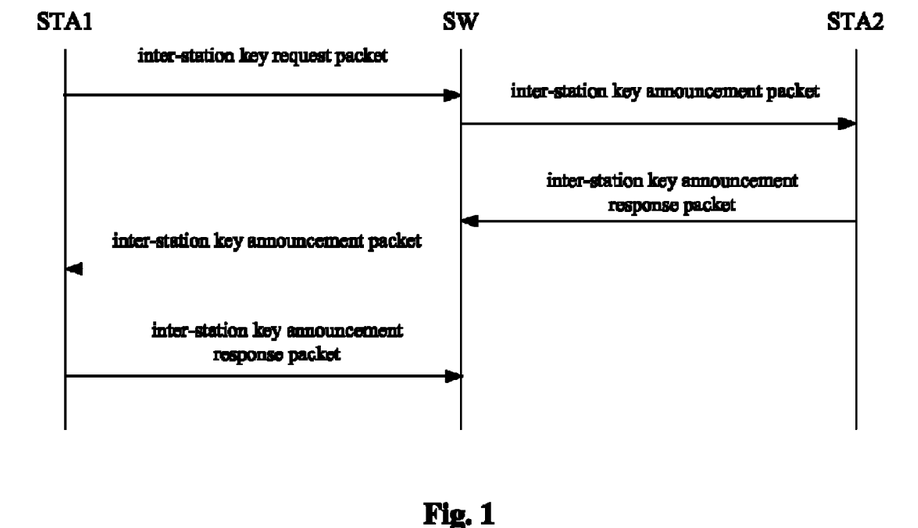
FIG. 1 is a schematic diagram of a method for establishing inter-station key provided by an embodiment of the present invention.
Figure 2:
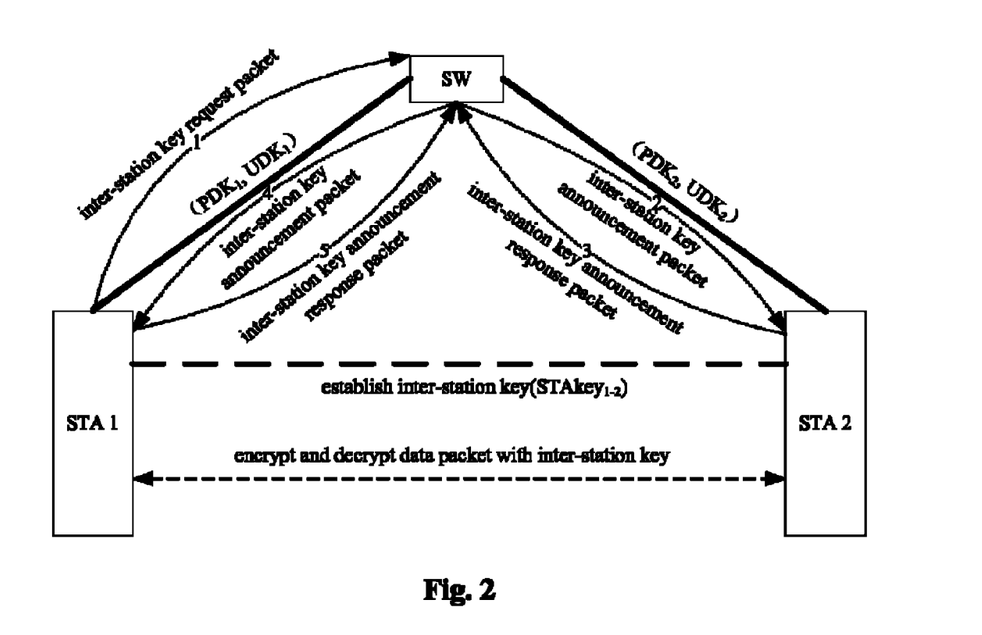
FIG. 2 is a schematic diagram of establishing security connection between stations provided by an embodiment of the present invention.

Assuming that security connection between the switch device and the station has been established based on a security mechanism such as pre-distribution, i.e., has the shared unicast key. Referring to FIGS. 1 and 2, an embodiment of the present invention provides a method and system for establishing security connection between stations, for establishing inter-station key between the direct-connected stations under the switch device.

By taking the establishment of an inter-station key STAkey$_{1-2}$ between a first station STA1 and a second station STA2 connected to a switch device SW as an example, the establishing processes are as follows. The first station STA1 sends an inter-station key request to the switch device SW, the switch device SW generates a random number as the inter-station key STA key$_{1-2}$ between the first station STA1 and the second station STA2, and then this inter-station key STA key$_{1-2}$ is secretly announced to the second station STA2 and the first station STA1 in this order. The whole procedure includes five steps totally: sending an inter-station key request to the switch device SW by the first station STA1, for requesting to establish an inter-station key between the first station STA1 and the second station STA2; performing an inter-station key announcement on the second station STA2 by the switch device SW; performing an inter-station key announcement response by the second station STA2; performing an inter-station key announcement on the first station STA1 by the switch device SW; and then performing an inter-station key announcement response by the first station STA1. The announcement of the switch device SW for the first station STA1 and the response of the first station STA1 are similar to the announcement of the switch device SW for the second station STA2 and the response of the second station STA2, except for the protocol data key PDK used by the announcement of the inter-station key.

The process of announcing the inter-station key for the station STA1 or STA2 by the switch device SW is to notify the station STA1 or STA2 to establish an inter-station key between the stations STA2 and STA1, or notify the station STA1 or STA2 to update the inter-station key between the stations STA2 and STA1, or notify the station STA1 or STA2 to withdraw the inter-station key between the stations STA2 and STA1. The processes of establishing, updating and withdrawing the inner-station key are the same, and can be distinguished by carrying an identifier field in practice.

The specific solution for establishing an inter-station key is as follows.

1) inter-station key request checking at first, by the first station STA1, whether an inter-station key shared with the second station STA2 is saved locally, if the first station STA1 and the second station STA2 are direct-connected stations of the switch device SW, when the first station STA1 communicates secretly with the second station STA2; encrypting a data packet by using the inter-station key directly, if the inter-station key is saved locally; else constructing an inter-station key request packet and sending the inter-station key request packet to the switch device SW by the first station STA1;

the main content of the inter-station key request packet includes:

where

KN1 field indicates a key announcement identifier of the first station STA1, the value of which is an integral number and an initial value of which is a fixed value, and the value of the KN1 field is increased by 1 or a fixed value for use every time the inter-station key request is performed; and MIC1 field indicates a message identification code, the value of which is a hash value obtained by the first station STA1 performing hash function calculation on the fields in the inter-station key request packet other than the MIC1 field by using the protocol data key PDK$_1$ in the unicast key shared with the switch device SW.

2) performing inter-station key request announcement on the second station STA2 by the switch device SW

The switch device SW performs the following processes after receiving the inter-station key request packet sent by the first station STA1:

2.1) checking whether the KN1 field increases monotonically; discarding this inter-station key request packet if not; else performing a step 2.2);

2.2) verifying whether the MIC1 field in the inter-station key request packet is correct by using the protocol data key PDK$_1$ in the unicast key shared with the first station STA1; performing a step 2.3) if the MIC1 field in the inter-station key request packet is correct; else discarding this inter-station key request packet; and 2.3) generating a random number as an inter-station key STAkey$_{1-2}$ between the first station STA1 and the second station STA2, constructing an inter-station key announcement packet, and sending the inter-station key announcement packet to the second station STA2.

the main content of the inter-station key announcement packet includes:

where

KN2 field indicates a key announcement identifier of the second station STA2, the value of which is an integral number and the initial value of which is a fixed value, and the value of the KN2 field is increased by 1 or a fixed value for use every time the inter-station key announcement is performed;

$E_2$ field indicates a key-encrypted data, and is the data obtained by the switch device SW encrypting the inter-station key $STAkey_{1-2}$ with the protocol data key $PDK_2$ in the unicast key shared with the second station STA2; and MIC2 field indicates a message identification code, the value of which is a hash value obtained by the switch device SW performing hash function calculation on the fields in the inter-station key announcement packet other than the MIC2 field by using the protocol data key $PDK_2$ in the unicast key shared with the second station STA2.

3) performing an inter-station key announcement response by the second station STA2

The second station STA2 performs the following processes after receiving the inter-station key announcement packet sent by the switch station SW:

3.1) checking the KN2 field increases monotonically; discarding this inter-station key announcement packet if not; else performing a step 3.2);

3.2) verifying whether the MIC2 field is correct by using the protocol data key $PDK_2$ in the unicast key shared with the switch device SW; discarding this inter-station key announcement packet if the MIC2 field is incorrect; and performing a step 3.3) if the MIC2 field is correct;

3.3) decrypting the $E_2$ field by using the protocol data key $PDK_2$ in the unicast key shared with the switch device SW to obtain the inter-station key $STAkey_{1-2}$ between the first station STA1 and the second station STA2; and 3.4) saving the value of this key announcement identifier, constructing an inter-station key announcement response packet and sending the inter-station key announcement response packet to the switch device SW.

the main content of the inter-station key announcement response packet includes:

where

KN2 field indicates the key announcement identifier of the second station STA2, the value of which is equal to that of the KN2 field in the received inter-station key announcement packet; and MIC3 field indicate a message identification code, and is a hash value obtained by the second station STA2 performing hash function calculation on the fields in the inter-station key announcement response packet other than the MIC3 field by using the protocol data key $PDK_2$ in the unicast key shared with the switch device SW.

4) performing inter-station key request announcement on the first station STA1 by the switch device SW

The switch device SW performs the following processes after receiving the inter-station key announcement response packet sent by the second station STA2:

4.1) comparing to determine whether the value of the KN2 field in the inter-station key announcement response packet is consistent with the value of the KN2 field in the inter-station key announcement packet sent to the second station STA2 previously; discarding this inter-station key announcement response packet if not consistent; and performing a step 4.2), if consistent;

4.2) verifying whether the MIC3 field is correct by using the protocol data key $PDK_2$ in the unicast key shared with the second station STA2; discarding this inter-station key announcement response packet if the MIC3 field is incorrect; else saving the value of this key announcement identifier KN2 field, and finishing the process of announcing the inter-station key $STAkey_{1-2}$ between the first station STA1 and the second station STA2 to the second station STA2, and performing a step 4.3); and 4.3) constructing an inter-station key announcement packet according to the inter-station key $STAkey_{1-2}$ that is announced to the second station STA2 previously, and sending the inter-station key announcement packet to the first station STA1.

The main content of the inter-station key announcement packet includes:

where

KN1 field indicates the key announcement identifier of the first station STA1, the value of which is equal to that of the KN1 field in the received inter-station key request packet sent by the first station STA1 previously;

$E_1$ field indicates a key-encrypted data, and is the data obtained by the switch device SW encrypting the inter-station key $STAkey_{1-2}$ with the protocol data key $PDK_1$ in the unicast key shared with the first station STA1, where the inter-station key $STAkey_{1-2}$ is the same as the inter-station key $STAkey_{1-2}$ that is announced to the second station STA2; and MIC4 field indicates a message identification code, the value of which is a hash value obtained by the switch device SW performing hash function calculation on the fields in the inter-station key announcement packet other than the MIC4 field by using the protocol data key $PDK_1$ in the unicast key shared with the first station STA1.

5) performing inter-station key announcement response by the first station STA1

The first station STA1 performs the following processes after receiving the inter-station key announcement packet sent by the switch station SW:

5.1) comparing to determine whether the value of the KN1 field in the inter-station key announcement packet is consistent with that of the KN1 field in the inter-station key request packet sent previously; discarding this inter-station key announcement packet, if not consistent; and performing a step 5.2) if consistent;

5.2) verifying whether the MIC4 field is correct by using the protocol data key $PDK_1$ in the unicast key shared with the switch device SW; discarding this inter-station key announcement packet, if the MIC4 field is incorrect; and performing a step 5.3) if the MIC4 field is correct;

5.3) decrypting the $E_1$ field by using the protocol data key $PDK_1$ in the unicast key shared with the switch device SW, to obtain the inter-station key $STAkey_{1-2}$ between the first station STA1 and the second station STA2; and 5.4) saving the value of this key announcement identifier KN1 field, constructing an inter-station key announcement response packet and sending the inter-station key announcement response packet to the switch device SW.

The main content of the inter-station key announcement response packet includes:

where

KN1 field indicates the key announcement identifier of the first station STA1, the value of which is equal to that of the KN1 field in the received inter-station key announcement packet; and MIC5 field indicate a message identification code, and is a hash value obtained by the first station STA1 performing hash function calculation on the fields in the inter-station key announcement response packet other than the MIC5 field by using the protocol data key $PDK_1$ in the unicast key shared with the switch device SW.

6) performing, by the switch device SW, the following processes after receiving the inter-station key announcement response packet sent by the first station STA1:

6.1) comparing whether the value of the KN1 field in the inter-station key announcement response packet is consistent with the value of the KN1 field in the inter-station key announcement packet sent to the first station STA1 previously; discarding this inter-station key announcement response packet if not consistent; and performing a step 6.2) if consistent; and 6.2) verifying whether the MIC5 field is correct by using the protocol data key $PDK_1$ in the unicast key shared with the first station STA1; saving the value of this key announcement identifier KN1 field if the MIC5 field is correct, finish the process of announcing the inter-station key $STAkey_{1-2}$ between the first station STA1 and the second station STA2 to the first station STA1; discarding this inter-station key announcement response packet if the MIC5 field is incorrect.

Herein, the maintenance and use of the key announcement identifier KN field of the station STA mentioned above are described additionally as follows. Each station STA will maintenance one key announcement identifier KN, the value of which is an integral number and the initial value of which is a fixed value, and the value of the key announcement identifier KN1 field is increased actively by 1 or a fixed value for use every time the inter-station key request packet is initiated, and is updated according to the value of the key announcement identifier KN field in a correct inter-station key announcement packet every time the correct inter-station key announcement packet is received. The switch device SW will maintain one key announcement identifier KN for all the direct-connected stations of the switch device SW. The value of the key announcement identifier KN of an station is increased by 1 or a fixed value for use when the switch device SW needs to announce the inter-station key to a station actively, and is updated by the switch device SW according to the value of the key announcement identifier KN field in a correct inter-station key announcement response packet every time the switch device SW receives the correct inter-station key announcement response packet. In the above embodiment, the process of announcing the inter-station by the switch SW to the second station STA2 is an active announcement process, and the process of announcing the inter-station by the switch SW to the first station STA1 is a passive announcement process. In the above embodiment, the first station STA1 maintains one key announcement identifier KN1, the second station STA2 maintains one key announcement identifier KN2, and the switch device SW maintains the key announcement identifier KN1 and the key announcement identifier KN2 for the first station STA1 and the second station STA2 respectively. After increasing the key announcement identifier KN1 maintained by the first station STA1 by 1 or a fixed value, the first station STA1 uses the key announcement identifier KN1 to initiate an inter-station key request packet; after increasing the key announcement identifier KN2 maintained by the second station STA2 by 1 or a fixed value, the switch SW uses the key announcement identifier KN2 to initiate an inter-station key announcement packet to the second station STA2 actively. After receiving a correct inter-station key announcement packet, the second station STA2 updates the value of the key announcement identifier KN2 maintained by itself according to the value of the key announcement identifier KN2 field in the correct inter-station key announcement packet; and after receiving the correct inter-station key announcement response packet sent by the second station STA2, the switch device SW updates the value of the key announcement identifier KN2 maintained by itself according to the value of the key announcement identifier KN2 field in the correct inter-station key announcement response packet. The switch device SW initiates an inter-station key announcement packet for the first station STA1 passively by using the key announcement identifier KN1 in the inter-station key request packet. After receiving a correct inter-station key announcement packet, the first station STA1 updates the value of the key announcement identifier KN1 maintained by itself according to the value of the key announcement identifier KN1 field in the correct inter-station key announcement packet; and after receiving a correct inter-station key announcement response packet sent by the first station STA1, the switch device SW updates the value of the key announcement identifier KN1 maintained by itself according to the value of the key announcement identifier KN1 field in the correct inter-station key announcement response packet.

In the process of establishing an inter-station key between the first station STA1 and the second station STA2 according to the request of the first station STA1, the switch device SW needs to announce for the second station STA2 at first, and then announce for the first station STA1. The whole process of establishing inter-station key is finished as long as both the announcement for the second station STA2 and the announcement for the first station STA1 are succeed.

If the station STA1 or STA2 needs to update or withdraw the inter-station key between the first station STA1 and the second station STA2, the station STA1 or STA2 needs to construct an inter-station key request packet and send the inter-station key request packet to the switch device SW for requesting to update or withdraw the inter-station key $STAkey_{1-2}$ between the first station STA1 and the second station STA2. The process of updating or withdrawing the inter-station key is similar as the process of establishing the inter-station key, which can be distinguish by adding an identifier field for in each packet mentioned above in practice, and the identifier field identifies the accomplishment of establishing, withdrawing and updating of the inter-station key between the station STA1 and the station STA2 by the switch device SW.

In practice, if the announcements for the stations STA2 and STA1 do not succeed, the announcement will be re-initiated based on a re-announcement mechanism. It is considered that it is impossible to establish an inter-station key between the stations STA1 and STA2, if the announcement for the second station STA2 has not succeeded when the maximum re-announcement time has been exceeded; it is considered that it is impossible to establish a inter-station key between the stations STA1 and STA2, if the announcement for the second station STA2 has succeeded and the announcement for the first station STA1 has not succeeded when the maximum re-announcement time has been exceeded, and in this case, it is necessary to notify the second station STA2 to withdraw the inter-station key that has been established just now between the first station STA1 and the second station STA2, i.e., the switch device SW constructs an inter-station key announcement packet for the second station STA2, and it is necessary to set a withdrawing identifier in the packet.

When secret communication is needed between the stations STA1 and STA2, each of the stations STA1 and STA2 can initiate the inter-station key request. According to a local strategy, in the case that the inter-station key is bi-directional, the inter-station key that is initiated and established by the station with large Media Access Control (MAC) address can be selected as the key used for the data secrecy transmission between the stations STA1 and STA2; and in the case that the inter-station key is unidirectional, the data packet is encrypted by the inter-station key that is established in the inter-station key establishing process initiated by the station STA1 or STA2 when the station STA1 or STA2 sends a data packet to the station STA2 or STA1, and the data packet is decrypted by using the inter-station key that is established in the inter-station key establishing process initiated by the station STA2 or STA1 when the station STA1 or STA2 receives a data packet from the station STA2 or STA1.

As shown in FIG. 2, both stations STA1 and STA2 are direct-connected stations of the switch device SW. Before the inter-station key is established, it is assumed that the station STA1 and STA2 establishes the security connection with the switch device SW respectively, i.e., shares the unicast key with the switch device SW respectively, seeing ($PDK_1$, $UDK_1$) and ($PDK_2$, $UDK_2$) in FIG. 2. The station STA1 and STA2 establishes the inter-station key through the switch device SW by performing the inter-station key establishing process, i.e., after performing the messages 1 to 5 in FIG. 2, seeing ($STAkey_{1-2}$) in FIG. 2. In this way, the communication data packet between the stations STA1 and STA2 is encrypted and decrypted by using this inter-station key $STAkey_{1-2}$ directly, the switch device SW transmits these data packets directly without processing of encryption and decryption, and thus the processing load of the switch device is reduced and the delay of the data transmission is decreased as compared with the conventional technique.

An embodiment of the present invention further provides a system for establishing security connection between stations, which includes a first station STA1 adapted for sending an inter-station key request packet and an inter-station key announcement response packet to a switch device SW, receiving an inter-station key announcement packet from the switch device SW, and communicating secretly with a second station STA2; the switch device SW adapted for receiving an inter-station key request packet, sending an inter-station key announcement packet to the second station STA2, receiving an inter-station key announcement response packet sent by the second station STA2, sending an inter-station key announcement packet to the first station STA1, and receiving an inter-station key announcement response packet sent by the first station STA1; and the second station STA2 adapted for receiving an inter-station key announcement packet sent by the switch device SW, sending an inter-station key announcement response packet to the switch device SW, and communicating secretly with the first station STA1.

The above method for establishing inter-station key between two direct-connected stations of the switch device can also be applied in the following situations: in the Local Area Network, when two stations perform data communication through the switch device system, the switch device system can include a number of switch devices, if some of these switch devices are two-layer switch devices and some are three-layer switch devices, the following security connection can be established in the data switching router between two stations: (1) the security connection between the sending station and the first three-layer switch device in the sending router, (2) the security connection between adjacent three-layer switch devices in the sending router, and (3) the security connection between the receiving station and the last three-layer switch device in the sending router, so as to realize the secret communication between the two stations. In those three security connections, the establishment of (1) and (3) can be implemented by using the method for establishing inter-station key in the embodiment of the present invention mentioned above. When the security connection in (1) is established, in FIGS. 1 and 2, the SWs are served by the switch device that is connected directly to the STA1, and the STA2s are served by the first three-layer switch device in the sending router; and when the security connection in (3) is established, in FIGS. 1 and 2, the SW are served by the switch device that is connected directly to the STA2, and the STA1 are served by the last three-layer switch device in the sending router. The method for establishing the security connection (2), i.e., the security connection between the three-layer switch devices, is not defined and limited in the embodiment of the present invention.

What is claimed is:
1. A method for establishing a security connection between stations, comprising:
  1) receiving, by a switch device, an inter-station key request packet sent by a first station,
    wherein the inter-station key request packet comprises a key announcement identifier KN1 field of the first station and a message identification code MIC1 field,
    wherein the value of the key announcement identifier KN1 field of the first station is an integral number and an initial value of that is a fixed value, and the value of the KN1 field is increased by 1 or a fixed value for use every time the inter-station key request is performed, and
    wherein the value of the message identification code MIC1 field is a hash value obtained by the first station performing hash function calculation on the fields in the inter-station key request packet other than the message identification code MIC1 field by using a protocol data key $PDK_1$ in a unicast key shared with the switch device;
  2) generating, by the switch device, an inter-station key, constructing an inter-station key announcement packet, and sending the inter-station key announcement packet to a second station;
  3) receiving, by the switch device, an inter-station key announcement response packet sent by the second station;
  4) constructing, by the switch device, an inter-station key announcement packet and sending the inter-station key announcement packet to the first station; and
  5) receiving, by the switch device, an inter-station key announcement response packet sent by the first station.

2. The method for establishing a security connection between stations according to claim 1, further comprising:
  checking at first, by the first station, whether there is the inter-station key saved locally and shared with the second station, if the first station and the second station are direct-connected stations of the switch device, when the first station communicates secretly with the second station; in the case that there is the inter-station key saved locally and shared with the second station, encrypting, by the first station, a data packet by using the inter-station key; and in the case that there is not the inter-station key saved locally and shared with the second station, constructing the inter-station key request packet and sending the inter-station key request packet to the switch device by the first station.

3. The method for establishing a security connection between stations according to claim 1, wherein the generating, by the switch device, an inter-station key, constructing an inter-station key announcement packet and sending the inter-station key announcement packet to the second station comprises:

checking, by the switch device, the key announcement identifier KN1 field of the first station;
   verifying whether the message identification code MIC1 field in the inter-station key request packet is correct by using the protocol data key $PDK_1$ in the unicast key shared with the first station, if the key announcement identifier KN1 field of the first station increases monotonically; and
   generating a random number as the inter-station key $STAkey_{1-2}$ between the first station and the second station, constructing the inter-station key announcement packet, and sending the inter-station key announcement packet to the second station, if the message identification code MIC1 field is correct; wherein the inter-station key announcement packet comprises a key announcement identifier KN2 field of the second station STA2, a key-encrypted data $E_2$ field and a message identification code MIC2 field.

4. The method for establishing a security connection between stations according to claim 3, wherein:

the value of the key announcement identifier KN2 field of the second station is an integral number and the initial value of that is a fixed value, and the value of the KN2 field is increased by 1 or a fixed value for use every time the inter-station key announcement is performed;
   the key-encrypted data $E_2$ field is the data obtained by the switch device encrypting the inter-station key $STAkey_{1-2}$ with a protocol data key $PDK_2$ in a unicast key shared with the second station; and
   the value of the message identification code MIC2 field is a hash value obtained by the switch device performing hash function calculation on the fields in the inter-station key announcement packet other than the message identification code MIC2 field by using the protocol data key $PDK_2$ in the unicast key shared with the second station.

5. The method for establishing a security connection between stations according to claim 4, further comprising:

checking, by the second station, the key announcement identifier KN2 field of the second station, after receiving the inter-station key announcement packet sent by the switch device;
   verifying whether the message identification code MIC2 field is correct by using the protocol data key $PDK_2$ in the unicast key shared with the switch device, if the key announcement identifier KN2 field of the second station increases monotonically;
   decrypting the key-encrypted data $E_2$ field by using the protocol data key $PDK_2$ in the unicast key shared with the switch device, to obtain the inter-station key $STAkey_{1-2}$ between the first station and the second station, if the message identification code MIC2 field is correct; and
   saving the value of this key announcement identifier KN2 field of the second station, constructing the inter-station key announcement response packet and sending the inter-station key announcement response packet to the switch device, wherein the inter-station key announcement response packet comprises a key announcement identifier KN2 field of the second station and a message identification code MIC3 field.

6. The method for establishing a security connection between stations according to claim 5, wherein:

the value of the key announcement identifier KN2 field of the second station in the inter-station key announcement response packet is equal to that of the key announcement identifier KN2 field of the second station in the inter-station key announcement packet received by the second station; and
   the value of the message identification code MIC3 field is a hash value obtained by the second station performing hash function calculation on the fields in the switch key announcement response packet other than the message identification code MIC3 field by using the protocol data key $PDK_2$ in the unicast key shared with the switch device.

7. The method for establishing a security connection between stations according to claim 6, wherein the constructing, by the switch device, an inter-station key announcement packet and sending the inter-station key announcement packet to the first station, comprises:

comparing, by the switch device, to determine whether the value of the key announcement identifier KN2 field of the second station in the inter-station key announcement response packet is consistent with the value of the key announcement identifier KN2 field of the second station in the inter-station key announcement packet sent to the second station previously, after receiving the inter-station key announcement response packet sent by the second station;
   verifying whether the message identification code MIC3 field is correct by using the protocol data key $PDK_2$ in the unicast key shared with the second station, if the value of the key announcement identifier KN2 field of the second station in the inter-station key announcement response packet is consistent with the value of the key announcement identifier KN2 field of the second station in the inter-station key announcement packet sent to the second station previously; saving the value of the key announcement identifier KN2 field, in the case that the message identification code MIC3 field is correct; and
   constructing an inter-station key announcement packet according to the inter-station key $STAkey_{1-2}$ that is announced to the second station previously, and sending the inter-station key announcement packet to the first station, wherein the inter-station key announcement packet comprises a key announcement identifier KN1 field of the first station, a key-encrypted data $E_1$ field and a message identification code MIC4 field.

8. The method for establishing a security connection between stations according to claim 7, wherein:

the value of the key announcement identifier KN1 field of the first station in the inter-station key announcement packet is equal to that of the key announcement identifier KN1 field of the first station in the received inter-station key request packet sent by the first station previously;
   the key-encrypted data $E_1$ field is the data obtained by the switch device encrypting the inter-station key $STAkey_{1-2}$ with the protocol data key $PDK_1$ in the unicast key shared with the first station; and
   the value of the message identification code MIC4 field is a hash value obtained by the switch device performing hash function calculation on the fields in the inter-station key announcement packet other than the message identification code MIC4 field by using the protocol data key $PDK_1$ in the unicast key shared with the first station.

9. The method for establishing a security connection between stations according to claim 8, further comprising:
    comparing, by the first station, to determine whether the value of the key announcement identifier KN1 field of the first station in the inter-station key announcement packet is consistent with that of the key announcement identifier KN1 field of the first station in the inter-station key request packet sent previously, after receiving the inter-station key announcement packet sent by the switch device;
    verifying whether the message identification code MIC4 field is correct by using the protocol data key $PDK_1$ in the unicast key shared with the switch device, if the value of the key announcement identifier KN1 field of the first station in the inter-station key announcement packet is consistent with that of the key announcement identifier KN1 field of the first station in the inter-station key request packet sent previously;
    decrypting the key-encrypted data $E_1$ field by using the protocol data key $PDK_1$ in the unicast key shared with the switch device, to obtain the inter-station key $STAkey_{1-2}$ between the second station and the first station, if the message identification code MIC4 field is correct; and
    saving the value of the key announcement identifier KN1 field of the first station, constructing the inter-station key announcement response packet and sending the inter-station key announcement response packet to the switch device, wherein the inter-station key announcement response packet comprises the key announcement identifier KN1 field of the first station and a message identification code MIC5 field.

10. The method for establishing a security connection between stations according to claim 9, wherein:
    the value of the key announcement identifier KN1 field of the first station in the inter-station key announcement response packet is equal to that of the key announcement identifier KN1 field of the first station in the inter-station key announcement packet received by the first station; and
    the value of the message identification code MIC5 field is a hash value obtained by the first station performing hash function calculation on the fields in the inter-station key announcement response packet other than the message identification code MIC5 field by using the protocol data key $PDK_1$ in the unicast key shared with the switch device.

11. The method for establishing a security connection between stations according to claim 10, further comprising:
    comparing, by the switch device, to determine whether the value of the key announcement identifier KN1 field of the first station in the inter-station key announcement response packet is consistent with that of the key announcement identifier KN1 field of the first station in the inter-station key announcement packet that is sent to the first station previously, after receiving the inter-station key announcement response packet sent by the first station;
    verifying whether the message identification code MIC5 field is correct by using the protocol data key $PDK_1$ in the unicast key shared with the first station, if the value of the key announcement identifier KN1 field of the first station in the inter-station key announcement response packet is consistent with that of the key announcement identifier KN1 field of the first station in the inter-station key announcement packet that is sent to the first station previously; and
    saving the value of this key announcement identifier KN1 field, if the message identification code MIC5 field is correct.

12. The method for establishing a security connection between stations according to claim 1, further comprising:
    constructing an inter-station key request packet and sending the inter-station key request packet to the switch device, so as to request to update or withdraw the inter-station key $STAkey_{1-2}$ between the first station and the second station, by the first station, when the first station needs to update or withdraw the inter-station key between the first station and the second station, or
    constructing an inter-station key request packet and sending the inter-station key request packet to the switch device, so as to request to update or withdraw the inter-station key $STAkey_{1-2}$ between the first station and the second station, by the second station, when the second station needs to update or withdraw the inter-station key between the first station and the second station,
    wherein the inter-station key request packet comprises a key announcement identifier KN1 field of the first station and a message identification code MIC1 field,
    wherein the value of the key announcement identifier KN1 field of the first station is an integral number and the initial value of that is a fixed value,
    wherein the value of the KN1 field is increased by 1 or a fixed value for use every time the inter-station key request is performed; and
    wherein the value of the message identification code MIC1 field is a hash value obtained by the first station performing hash function calculation on the fields in the inter-station key request packet other than the message identification code MIC1 field by using a protocol data key $PDK_1$ in a unicast key shared with the switch device.

13. A system for establishing a security connection between stations, wherein the system for establishing security connection between direct-connected stations of a switch device comprises:
    a first station adapted for sending an inter-station key request packet and an inter-station key announcement response packet to the switch device, receiving an inter-station key announcement packet from the switch device and communicating secretly with a second station; and
    the switch device adapted for receiving the inter-station key request packet, sending an inter-station key announcement packet to the second station, receiving an inter-station key announcement response packet sent by the second station, sending the inter-station key announcement packet to the first station, and receiving the inter-station key announcement response packet sent by the first station,
    wherein the inter-station key request packet comprises a key announcement identifier KN1 field of the first station and a message identification code MIC1 field, and
    wherein the value of the key announcement identifier KN1 field of the first station is an integral number and an initial value of that is a fixed value,
    wherein the value of the KN1 field is increased by 1 or a fixed value for use every time the inter-station key request is performed; and
    wherein the value of the message identification code MIC1 field is a hash value obtained by the first station performing hash function calculation on the fields in the inter-station key request packet other than the message identification code MIC1 field by using a protocol data key $PDK_1$ in a unicast key shared with the switch device; and wherein the second station is adapted for receiving the inter-station key announcement packet sent by the switch device, and for sending the inter-station key announcement response packet to the switch device and communicating secretly with the first station.

14. The system for establishing a security connection between stations according to claim 13, wherein the switch device adapted for sending an inter-station key announcement packet to the second station is further adapted for:
  checking the key announcement identifier KN1 field of the first station;
  verifying whether the message identification code MIC1 field in the inter-station key request packet is correct by using the protocol data key $PDK_1$ in the unicast key shared with the first station;
  if the key announcement identifier KN1 field of the first station increases monotonically, generating a random number as the inter-station key $STAkey_{1-2}$ between the first station and the second station, constructing the inter-station key announcement packet; and
  sending the inter-station key announcement packet to the second station, if the message identification code MIC1 field is correct,
  wherein the inter-station key announcement packet comprises a key announcement identifier KN2 field of the second station STA2, a key-encrypted data $E_2$ field and a message identification code MIC2 field,
  wherein the value of the key announcement identifier KN2 field of the second station is an integral number and the initial value of that is a fixed value,
  wherein the value of the KN2 field is increased by 1 or a fixed value for use every time the inter-station key announcement is performed,
  wherein the key-encrypted data $E_2$ field is the data obtained by the switch device encrypting the inter-station key $STAkey_{1-2}$ with a protocol data key $PDK_2$ in a unicast key shared with the second station; and
  wherein the value of the message identification code MIC2 field is a hash value obtained by the switch device performing hash function calculation on the fields in the inter-station key announcement packet other than the message identification code MIC2 field by using the protocol data key $PDK_2$ in the unicast key shared with the second station.

15. The system for establishing a security connection between stations according to claim 14, wherein the second station is further adapted for:
  checking the key announcement identifier KN2 field of the second station, after receiving the inter-station key announcement packet sent by the switch device;
  verifying whether the message identification code MIC2 field is correct by using the protocol data key $PDK_2$ in the unicast key shared with the switch device;
  if the key announcement identifier KN2 field of the second station increases monotonically, decrypting the key-encrypted data $E_2$ field by using the protocol data key $PDK_2$ in the unicast key shared with the switch device, to obtain the inter-station key $STAkey_{1-2}$ between the first station and the second station, if the message identification code MIC2 field is correct; and
  saving the value of this key announcement identifier KN2 field of the second station, constructing the inter-station key announcement response packet and sending the inter-station key announcement response packet to the switch device, wherein the inter-station key announcement response packet comprises a key announcement identifier KN2 field of the second station and a message identification code MIC3 field,
  wherein the value of the key announcement identifier KN2 field of the second station in the inter-station key announcement response packet is equal to that of the key announcement identifier KN2 field of the second station in the inter-station key announcement packet received by the second station; and
  wherein the value of the message identification code MIC3 field is a hash value obtained by the second station performing hash function calculation on the fields in the switch key announcement response packet other than the message identification code MIC3 field by using the protocol data key $PDK_2$ in the unicast key shared with the switch device.

16. The system for establishing a security connection between stations according to claim 15, wherein the switch device adapted for:
  sending the inter-station key announcement packet to the first station is further adapted to comparing, by the switch device, to determine whether the value of the key announcement identifier KN2 field of the second station in the inter-station key announcement response packet is consistent with the value of the key announcement identifier KN2 field of the second station in the inter-station key announcement packet sent to the second station previously, after receiving the inter-station key announcement response packet sent by the second station;
  verifying whether the message identification code MIC3 field is correct by using the protocol data key $PDK_2$ in the unicast key shared with the second station, if the value of the key announcement identifier KN2 field of the second station in the inter-station key announcement response packet is consistent with the value of the key announcement identifier KN2 field of the second station in the inter-station key announcement packet sent to the second station previously;
  saving the value of the key announcement identifier KN2 field, in the case that the message identification code MIC3 field is correct; and
  constructing an inter-station key announcement packet according to the inter-station key $STAkey_{1-2}$ that is announced to the second station previously, and sending the inter-station key announcement packet to the first station,
  wherein the inter-station key announcement packet comprises a key announcement identifier KN1 field of the first station, a key-encrypted data $E_1$ field and a message identification code MIC4 field,
  wherein the value of the key announcement identifier KN1 field of the first station in the inter-station key announcement packet is equal to that of the key announcement identifier KN1 field of the first station in the received inter-station key request packet sent by the first station previously,
  wherein the key-encrypted data $E_1$ field is the data obtained by the switch device encrypting the inter-station key $STAkey_{1-2}$ with the protocol data key $PDK_1$ in the unicast key shared with the first station, and
  wherein the value of the message identification code MIC4 field is a hash value obtained by the switch device performing hash function calculation on the fields in the inter-station key announcement packet other than the message identification code MIC4 field by using the protocol data key $PDK_1$ in the unicast key shared with the first station.

17. The system for establishing a security connection between stations according to claim 16, wherein the first station is adapted for:

comparing to determine whether the value of the key announcement identifier KN1 field of the first station in the inter-station key announcement packet is consistent with that of the key announcement identifier KN1 field of the first station in the inter-station key request packet sent previously, after receiving the inter-station key announcement packet sent by the switch device;

verifying whether the message identification code MIC4 field is correct by using the protocol data key $PDK_1$ in the unicast key shared with the switch device, if the value of the key announcement identifier KN1 field of the first station in the inter-station key announcement packet is consistent with that of the key announcement identifier KN1 field of the first station in the inter-station key request packet sent previously;

decrypting the key-encrypted data $E_1$ field by using the protocol data key $PDK_1$ in the unicast key shared with the switch device, to obtain the inter-station key $STAkey_{1-2}$ between the second station and the first station, if the message identification code MIC4 field is correct; and saving the value of the key announcement identifier KN1 field of the first station, constructing the inter-station key announcement response packet and sending the inter-station key announcement response packet to the switch device,     wherein the inter-station key announcement response packet comprises the key announcement identifier KN1 field of the first station and a message identification code MIC5 field,     wherein the value of the key announcement identifier KN1 field of the first station in the inter-station key announcement response packet is equal to that of the key announcement identifier KN1 field of the first station in the inter-station key announcement packet received by the first station, and     wherein the value of the message identification code MIC5 field is a hash value obtained by the first station performing hash function calculation on the fields in the inter-station key announcement response packet other than the message identification code MIC5 field by using the protocol data key $PDK_1$ in the unicast key shared with the switch device.

18. The system for establishing a security connection between stations according to claim 17, wherein the switch device is further adapted for:

comparing to determine whether the value of the key announcement identifier KN1 field of the first station in the inter-station key announcement response packet is consistent with that of the key announcement identifier KN1 field of the first station in the inter-station key announcement packet that is sent to the first station previously, after receiving the inter-station key announcement response packet sent by the first station;

verifying whether the message identification code MIC5 field is correct by using the protocol data key $PDK_1$ in the unicast key shared with the first station, if the value of the key announcement identifier KN1 field of the first station in the inter-station key announcement response packet is consistent with that of the key announcement identifier KN1 field of the first station in the inter-station key announcement packet that is sent to the first station previously; and     saving the value of this key announcement identifier KN1 field, if the message identification code MIC5 field is correct.

* * * * *